(No Model.) 2 Sheets—Sheet 1.
B. C. SMITH.
WATER CLOSET.
No. 484,617. Patented Oct. 18, 1892.
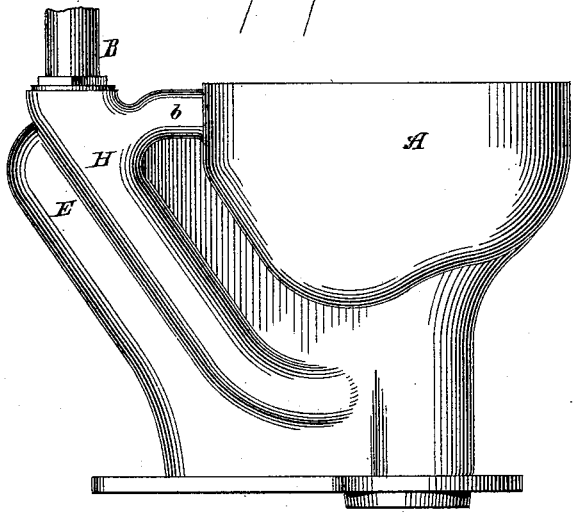
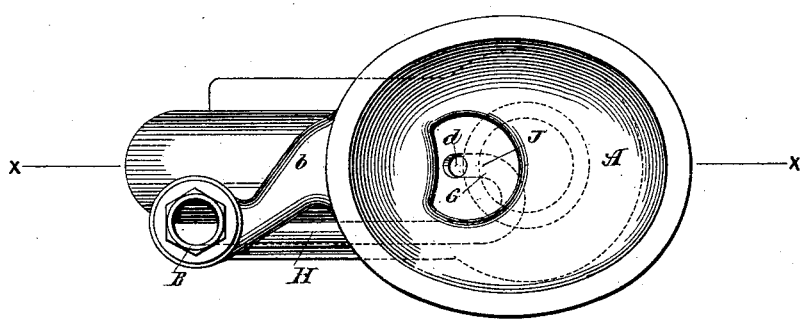
WITNESSES:
William Goebel
Miles Woodford Brooks
INVENTOR
Benjamin C. Smith
BY
T. F. Bourne
his ATTORNEY.

(No Model.) 2 Sheets—Sheet 2.

B. C. SMITH.
WATER CLOSET.

No. 484,617. Patented Oct. 18, 1892.

WITNESSES:
William Goebel.
Miles Woodford Brooks.

INVENTOR
Benjamin C. Smith
BY
T. F. Bourne
his ATTORNEY.

UNITED STATES PATENT OFFICE.

BENJAMIN C. SMITH, OF BROOKLYN, NEW YORK.

WATER-CLOSET.

SPECIFICATION forming part of Letters Patent No. 484,617, dated October 18, 1892.

Application filed June 29, 1891. Serial No. 397,764. (No model.)

*To all whom it may concern:*

Be it known that I, BENJAMIN C. SMITH, a citizen of the United States, and a resident of Brooklyn, Kings county, New York, have invented a certain new and useful Improvement in Water-Closets, of which the following is a specification.

The object of my invention is to produce a water-closet or the like in which the siphonic action for discharging it shall be created automatically as the water from the bowl passes through the discharging-limb of the closet.

The invention consists in the novel details of improvement and the combinations of parts that will be more fully hereinafter set forth, and then pointed out the claim.

Reference is to be had to the accompanying drawings, forming part hereof, wherein—

Figure 3:
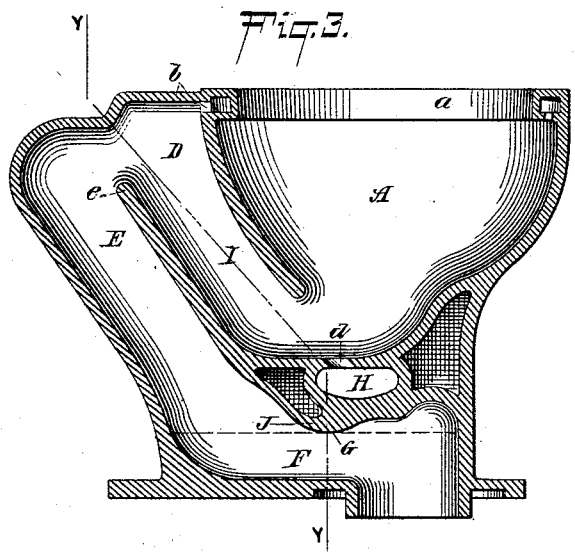
Figure 4:
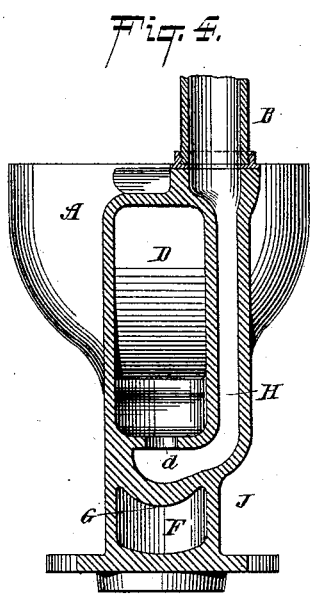

Figure 1 is a side elevation of a water-closet embodying my invention. Fig. 2 is a plan view thereof. Fig. 3 is a vertical longitudinal section on the plane of the line $x\ x$, Fig. 2; and Fig. 4 is a vertical cross-section on the plane of the line $y\ y$ in Fig. 3.

In the accompanying drawings, the letter A indicates a suitable water-closet bowl, having a flushing-rim $a$, that is shown connected by a tube $b$, with a supply-pipe B, which latter may be fed by a tank or otherwise.

D is a trap formed as usual in siphon-closets and communicating with a downward discharge passage or pipe E, that extends horizontally and forwardly beneath the bowl, as at F, (see Fig. 3,) to be connected with a soil-pipe.

In the upper inner wall of the horizontal part F of the discharge-passage E, I place a depression G, which acts to decrease the diameter of the discharge-passage at that point. This depression may be curved with its greatest convexity at the center of the passage F, if desired, as shown in Fig. 4, so as not to retard the free flow of water; but this depression G may have any desired shape.

To assist the discharge of water from the bowl, I prefer to use a jet that receives its water-supply direct from the pipe B, and for this purpose I use a tube or pipe H, that connects with the pipe B, as shown, and at one part is shown extending along the outer side of the trap D and E. The tube or pipe H at its lower part bends inward and leads to the bottom of the bowl A, opening into the same through an aperture $d$, that is shown in line with the uptake-leg I of the trap D. By this means the water from the jet will tend to force water from the bowl over the dam $c$ of the trap D.

For the sake of simplicity and cheapness, I prefer to utilize one wall J of the jet tube or pipe H to form the depression G in the passage-way F, and for this purpose the tube or pipe H is carried inward in such manner that its lower wall at J shall extend into the passage-way F, as clearly shown in Figs. 3 and 4, whereby the depression G is formed. It will be noticed that there is no direct communication between the jet and the passage-way E F.

My improvements operate as follows: A certain amount of water is allowed to stand in the bowl A, say, about as high as the dam $c$. Water now being admitted to the pipe B passes to the jet $d$, causing water from the bowl to flow over the dam $c$ and into the passage-way F. If the water passing through F is not sufficiently high to reach the depression G, it will merely run out to the soil-pipe without creating a siphonic action; but as soon as water passes through the passage-way F of sufficient height to reach the depression G, as shown in dotted lines, Fig. 3, ripples will be made on the surface of the water, causing the same to rise at that point so as to close off the space above the water in line with the depression G, whereby air from the soil-pipe is prevented from passing back into the trap, said depression taking the place of the air that would be admitted. As the water flows from the bowl it exhausts the air from the trap D, and as the admission of air is prevented, as stated, a vacuum is formed and thus a siphonic action is created in the passage-way, whereby the contents of the bowl will be thoroughly discharged. Although not sufficient water may be passing through the passage-way E F to entirely fill the same, as soon as it encounters the depression G it will rise and thus shut off the air to create a siphonic action. By placing the depression in the horizontal part of the passage-way F the proper rising of water to insure the shutting off of the air is effected. The action of creating a siphon is perfectly automatic, and the construction is extremely simple and not liable to get out of order. By having the depression on the upper side of the horizontal passage-way, danger of material being caught is prevented. After the bowl has been discharged it can be recharged by an after flow from the pipe B through the rim $a$ and jet $d$.

Having now described my invention, what I claim is—

A water-closet having a trap substantially horizontal, a discharge-passage leading therefrom, and a jet tube or pipe leading to the bowl, one wall of said tube or pipe extending into said passage-way to form a depression in said passage-way to cause water flowing through the latter to shut off the air-supply, substantially as described.

In testimony that I claim the foregoing as my invention I have signed my name, in presence of two witnesses, this 25th day of June, 1891.

BENJAMIN C. SMITH.

Witnesses:
T. F. BOURNE,
E. W. BENTON.